United States Patent
Shramo et al.

[11] Patent Number: 5,875,835
[45] Date of Patent: Mar. 2, 1999

[54] THERMAL FILTERING SYSTEM

[76] Inventors: Daniel J. Shramo, 800 Brick Mill Run, Apt. 419, Westlake, Ohio 44145; Kenneth Loparo, 12310 Caves Rd., Chesterland, Ohio 44026

[21] Appl. No.: 606,379

[22] Filed: Feb. 23, 1996

[51] Int. Cl.⁶ ................................................. F28F 27/00
[52] U.S. Cl. ............................... 165/96; 165/10; 165/53; 165/135; 252/70
[58] Field of Search .............................. 165/10, 46, 135, 165/53, 96, 132, 104.17, 134.1, 52; 252/70; 126/619

[56] References Cited

U.S. PATENT DOCUMENTS

| | | | |
|---|---|---|---|
| 4,178,727 | 12/1979 | Prusinski et al. | 165/52 X |
| 4,259,401 | 3/1981 | Chahroudi et al. | 165/132 X |
| 4,367,788 | 1/1983 | Cordon | 165/53 |
| 4,532,917 | 8/1985 | Taff et al. | 165/104.17 X |
| 4,572,864 | 2/1986 | Benson et al. | 252/70 X |
| 4,856,294 | 8/1989 | Scaringe et al. | 165/46 X |
| 5,532,039 | 7/1996 | Payne et al. | 126/619 X |
| 5,626,936 | 5/1997 | Alderman | 165/46 X |
| 5,722,482 | 3/1998 | Buckley | 165/10 |

*Primary Examiner*—Ira S. Lazarus
*Assistant Examiner*—Christopher Atkinson
*Attorney, Agent, or Firm*—Renner, Otto, Boisselle & Sklar, P.L.L.

[57] ABSTRACT

The present invention provides a novel thermal filtering system and method for making such a thermal filtering system to filter out external temperature fluctuations within an enclosure. In accordance with one aspect of the invention the system includes an external insulation layer, an internal insulation layer, and a layer of phase change material located in between and thermally in series with the layers of insulation.

10 Claims, 2 Drawing Sheets

5,875,835

THERMAL FILTERING SYSTEM

FIELD OF THE INVENTION

This invention relates generally to a thermal filtering system and a method for making such a thermal filtering system, and more particularly, to a combination of thermal insulation and a phase change material and a method of making such a combination for use as a thermal filter.

BACKGROUND OF THE INVENTION

The benefits of adding insulation to a structure are well known. Insulation restricts the flow of heat from a higher temperature (the "hot" side), through the insulating materials, to a lower temperature (the "cold" side). As soon as a temperature difference exists across an insulating material, thermal energy begins to flow. By slowing the rate of heat transfer, insulation enables conventional heating and cooling devices to maintain a desired temperature within a structure. However, because the heat begins to flow nearly instantaneously, a change in either the inside or the outside temperature is instantly reflected in a change in the rate of heat flow. In order to maintain the desired internal temperature, the heating and cooling equipment must be able to respond quickly to changes in the temperature difference. This may be difficult, however, because structures generally have either a large volume of air or a large mass in the internal environment, both of which resist rapid temperature changes. As a result, during rapid external temperature variations, the inside temperature is often either higher or lower than desired. It would be desirable to devise a method of maintaining a nearly constant rate of heat flow so as to maximize the efficiency of conventional heating and cooling equipment and to improve the correlation between the desired inside temperature and the actual inside temperature. In so doing, both the temperature variations and energy output required to maintain a desired inside temperature would be minimized.

Common forms of insulation include fiberglass batts and boards of extruded polystyrene. Other insulating materials include various vegetable and mineral fibers (generally used as blown-in insulation), other minerals (such as expanded perlite), and metal foils (for reflecting radiant thermal energy). Perlite is a naturally occurring volcanic glass which may be expanded to form an insulating material having many voids. It is the presence of such voids and the air or other gases that they entrap that provide the insulating properties of most insulating materials.

During the 1970s and 1980s, thermal research focused on development of suitable materials and configurations for storing solar energy during periods of peak solar insolation, and releasing it gradually during off-peak periods or during the night to the inside environment. These materials were generally built to store solar energy falling directly onto containers filled with phase change materials (hereinafter PCMs). PCMs attracted interest for their ability to store heat energy. PCMs are chemical compounds that use the latent heat properties of a material to store heat energy as chemical energy. "Latent heat" is a measure of the energy required to change a material from one state to another. A PCM stores heat by "melting" (or changing from a solid to a liquid) and releases heat by "freezing" (or changing from a liquid to a solid). Unfortunately, some PCMs are very hygroscopic, which means that they absorb water, which in turn decreases their effectiveness by providing a path for heat transfer through the PCM, in effect, a thermal short circuit.

The interest in phase change materials for building envelopes waned with the decrease in interest in active solar heating. The experience revealed, however, that the corrosive nature of the salts used as PCMs made it difficult to prevent PCM storage containers from leaking. Therefore it would be desirable to have these PCM materials stored in a medium that would not be affected by the corrosive salts, and that would seal the PCM off from atmospheric humidity.

The interest in solar energy developed in part from petroleum fuel shortages. The shortages and concomitant increased prices heightened both utilities' and consumers' awareness of their energy usage. This concern has remained to this day. Energy utility rates are generally lower at the time of day when the load on the utility system is the lightest. The utilities prefer to have a steady demand, and naturally, both commercial and private consumers prefer to pay lower rates. With ever increasing energy costs it would be desirable to move energy consumption to the time of day when the rates will be the lowest, thereby leveling out the load on the utility system as well.

SUMMARY OF THE INVENTION

The present invention provides a novel thermal filtering system and method for making such a thermal filtering system to filter out external temperature fluctuations within an enclosure. In accordance with one aspect of the invention the system includes an external insulation layer, an internal insulation layer, and a layer of phase change material disposed between and thermally in series with the layers of insulation.

In accordance with another aspect of the invention, a method of making a thermal filtering system includes the steps of depositing a phase change material into a leak-resistant containment system, sealing the phase change material from external humidity with a low temperature melting point sealing material, if necessary, and then placing the phase change material between two layers of insulation.

These and other features of the invention are fully described and particularly pointed out in the claims. The following descriptive annexed drawings set forth in detail an illustrative embodiment of the invention, this embodiment being indicative, however, of but one of the various ways in which the principles of the invention may be employed.

DETAILED DESCRIPTION OF THE INVENTION

Figure 1:
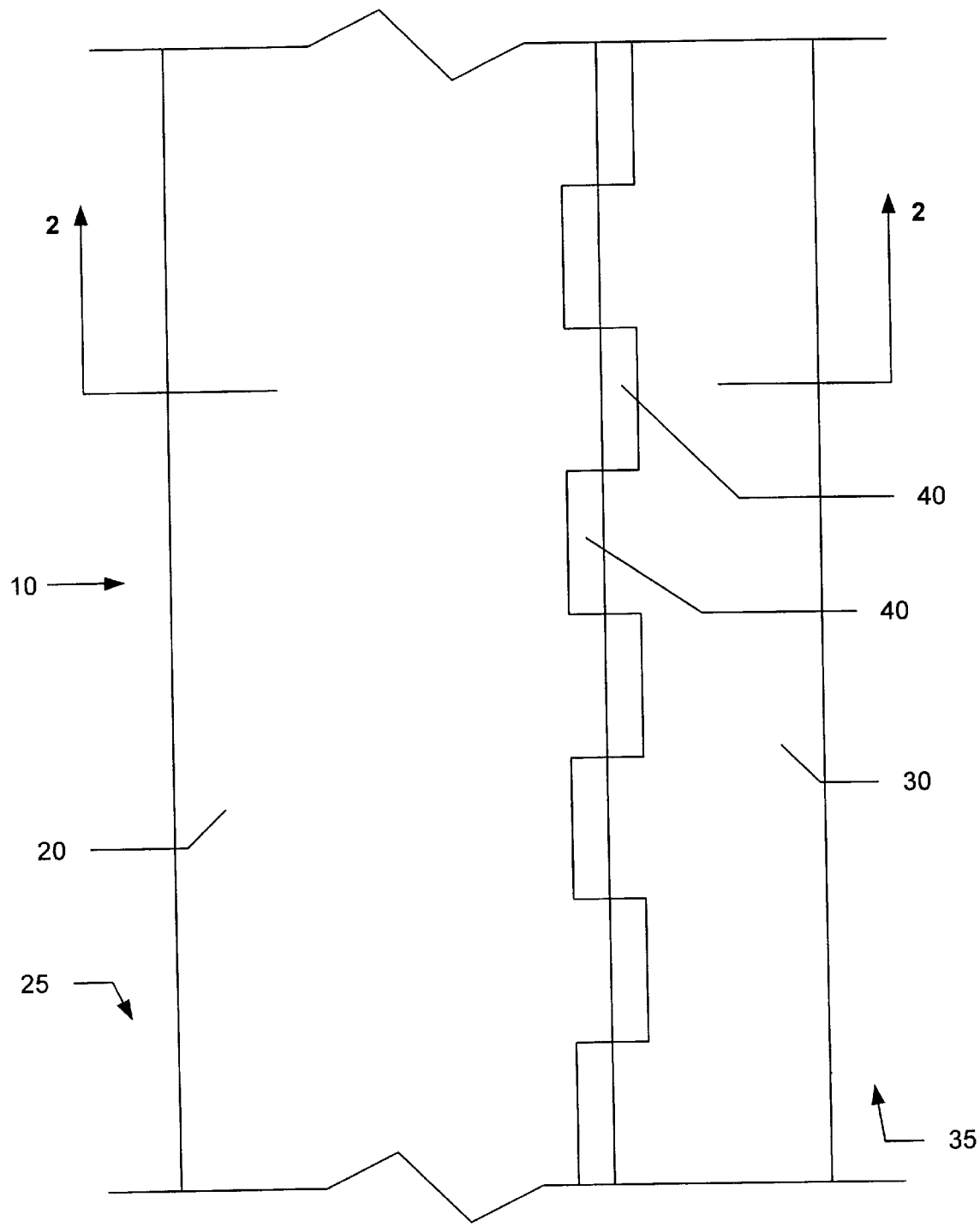
FIG. 1 is a schematic top view of a thermal filtering system showing staggered placement of the phase change material layer.
Figure 2:
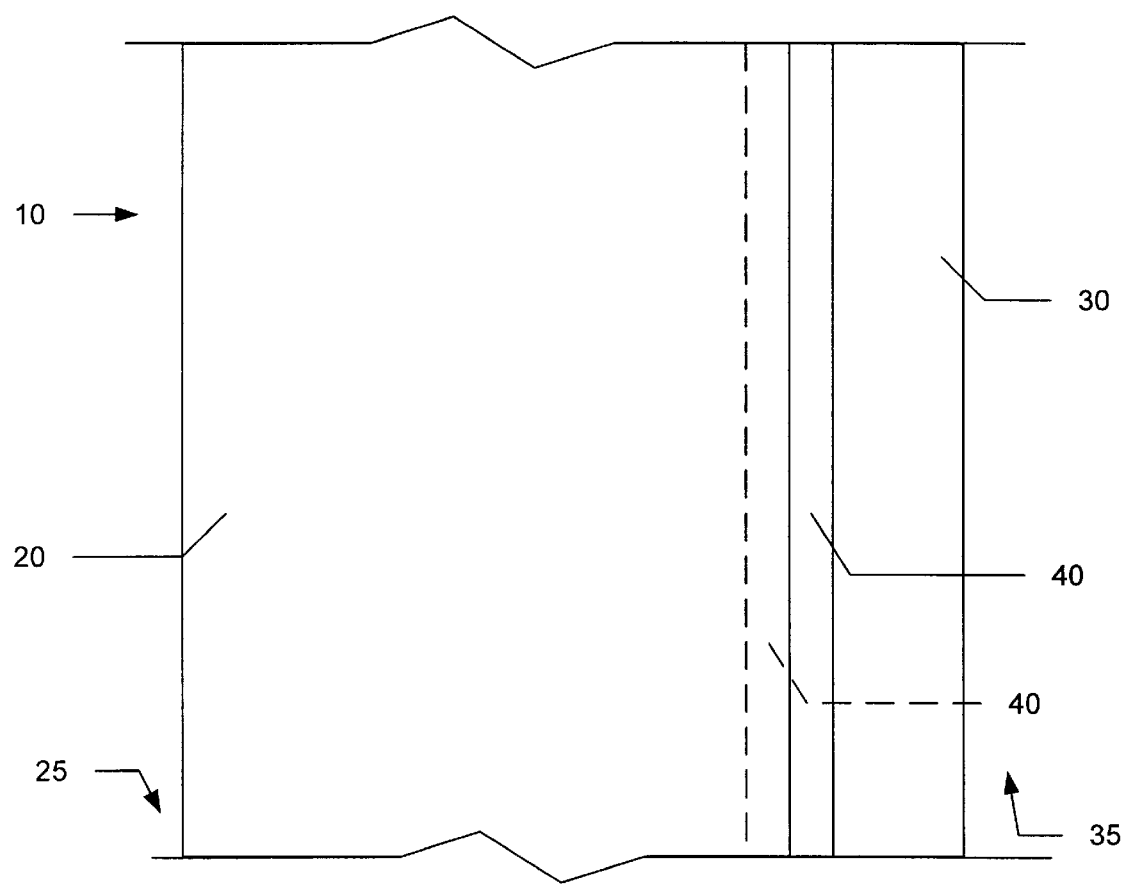
FIG. 2 is a schematic end view of a thermal filtering system, as seen in FIG. 1, looking from the line 2—2 thereof.

With reference to the drawings and initially to FIGS. 1 and 2 there is shown a schematic top view of a thermal filtering system 10 including an internal layer of insulation 20, an external layer of insulation 30, and a phase change layer 40 disposed between the layers of insulation 20 and 30. (FIG. 1 is a top view of the thermal filtering system 10 and FIG. 2 is a side view of the system taken along the line 2—2 in FIG. 1). The external layer of insulation 30 is positioned proximate the outside environment 35 which is subject to uncontrollable, fluctuating atmospheric conditions at temperature $T_1$. The internal layer of insulation 30 is positioned proximate an inside environment 25, at temperature $T_2$, the inside environment 25 being the controlled environment or the side at which a specified temperature is desired, such as the interior of a house. Although the phase change layer 40 is shown in FIG. 1 in a staggered configuration, the layer 40 may also be configured in numerous other ways, for example, as a continuous sheet disposed between the layers of insulation 20 and 30.

The phase change layer 40 includes a phase change material and a containment medium for containing the phase change material. The phase change material (hereinafter PCM) acts as a thermal capacitor by storing heat energy as chemical energy approximately equal to the latent heat energy required to affect a phase change in the material. As a temperature difference develops across the PCM, heat energy attempts to flow from the hot side of the material to the cold side. The heat is absorbed by the PCM until it is saturated and all of the PCM has changed phase. Although the phase change generally occurs between the solid and liquid phases, other phase transitions may be utilized as well. Once the phase change has reached its conclusion, heat flows through the PCM with minimal resistance. The PCM releases its stored heat by a reverse phase change process once the temperature on either side falls below the phase change temperature.

When the temperature inside a structure falls below a specified level, supplemental heat sources must be used to maintain the desired temperature. The extreme or peak rate of heat flow is delayed because heat is accumulated in the PCM until it is saturated. The delay can be long enough to move the peak rate of heat flow to a time of day when the temperature differential across the system 10 is reversed, thereby reducing or eliminating the need for a supplemental heat source. The delay may also lower the cost of supplemental heating by moving the peak rate of heat flow to a time of day when utility rates are the lowest. With a delay of more than twenty-four hours, the system 10 eliminates the effects of transient temperature changes on heat transfer providing nearly constant heat flow through the system 10.

Figure 3:
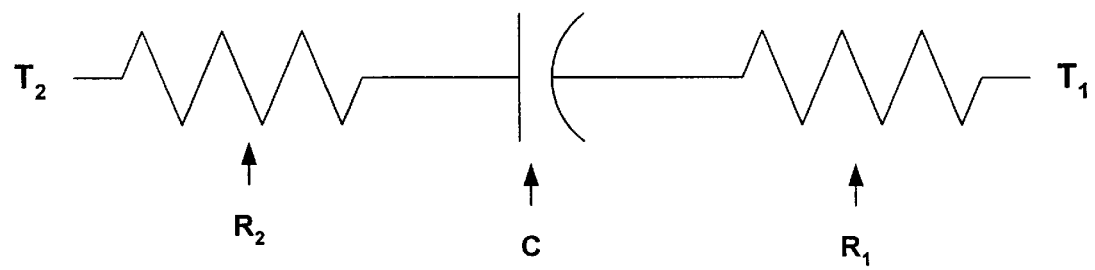
FIG. 3 is a schematic of a thermal circuit.

FIG. 3 illustrates the thermal circuit of the thermal filtering system 10 by its electrical circuit analogy as a capacitor in series between two resistors. The capacitor C represents the thermal capacitance of the phase change layer 40 with the thermal resistances of the insulation layers 20 and 30 represented by resistors $R_1$ and $R_2$, respectively. The thermal filter system 10 can thus be viewed as an RCR circuit with the response of the system to a thermal input from the ambient environment 35 being modelled by the time constant of the RCR circuit.

All materials change state at some temperature and require differing amounts of energy to do so. For use in a building a material having a transition temperature that is close to a comfortable temperature for people or animals, approximately 65 to 100 degrees Fahrenheit, is preferable. For example, a well-known PCM is sodium sulfate decahydrate (Glauber's Salt) which melts at 32.4° C. (90.3° F.). Glauber's Salt is also used as a PCM because it can absorb a substantial amount of energy as it melts from a solid phase to a liquid phase. A suitable phase change material which could be used in the present invention is a calcium chloride hydrate, such as that sold by Dow Chemical Company under the trademark "Dowflake." Other non-salt materials such as paraffin can also be used.

The containment medium for containing the phase change material is preferably perlite bound within a matrix with a sealing material, although other media can be employed for containing the phase change material, such as vermiculite. Perlite is a naturally occurring volcanic glass which can be expanded to form an insulating material having many voids. These voids can absorb a significant quantity of phase change material. Because these voids are small, the surface tension of the phase change material enables the perlite to retain the PCM while remaining surface dry even when the PCM is in liquid form.

Perlite can absorb the preferred phase change material of calcium chloride hydrate up to approximately 12 parts PCM to 1 part perlite by weight. The thermal capacitance of the phase change layer 40 is a function of the volume of the phase change material in the phase change layer. Thus the amount of PCM to be mixed with the perlite and the thickness of the phase change layer 40 are correlated to provide the desired amount of thermal capacitance for a given application. For many applications, such as in a residential applications, where the thermal filtering system 10 may be used within a wall or above a ceiling, a ratio of PCM to perlite from 2:1 to saturation is preferred, with the ratio of 6:1 being more preferred.

In many such applications it is desirable that a sufficient volume of phase change material be contained within the phase change layer 40 that the thermal filtering system 10 filters out the diurnal peak rates of heat flow to provide a nearly constant heat flow rate substantially throughout the day despite external temperature fluctuations. In an exemplary wall application, the phase change layer 40 may be approximately one quarter of an inch thick with a ratio of calcium chloride hydrate to perlite of approximately 6:1, sandwiched between insulating layers 20 and 30, of fiberglass insulation of 2 inches thick and 1 inch thick, respectively. Alternatively, lesser volumes of phase change material can be employed within the phase change layer to shift the peak rate of heat flow through the thermal filtering system 10 to a time of day when the utility rates are lowest, as discussed above.

Some PCMs at the desired transition temperatures are very hygroscopic. Therefore, those PCMs must be sealed from external moisture because the addition of moisture reduces thermal capacitance. The sealant binding the PCM-filled perlite is thus preferably a low temperature melting point polymer-like compound, such as paraffin, low melting point polyvinyl chloride (PVC), or other petroleum products. The PCM-filled perlite may be mixed with the polymer sealant or the sealant may be sprayed onto the perlite. The ratio of polymer to perlite is most desirable in the ratio of 95% perlite to 5% sealant, by weight. The resulting compound not only seals the PCM/perlite matrix but also provides a product that can then be formed into a desired shape.

In the preferred sheet form the PCM layer 40 can be unrolled onto existing insulation or bonded between layers of new insulation during the manufacturing process. PCM may also be packed in small envelopes prior to insertion into the insulation. In either packaging concept, the PCM is sealed from gaining/losing moisture and the PCM and insulation combination can be penetrated or cut without compromising its beneficial qualities.

The layers of insulation 20 and 30 are added to improve the thermal resistance of the system 10 when the PCM is saturated. Although insulation slows the rate of heat transfer, it permits heat transfer to begin as soon as a temperature difference exists across the insulation. The PCM stores the excess heat as it flows through the insulation from either side, thereby delaying or even eliminating the need for temperature assistance in the inside environment 25.

As illustrated in FIGS. 1 and 2, the internal layer of insulation 20 is preferably thicker than the external layer 30. The internal layer 20 should be at least as thick as the external layer 30 and preferably twice as thick. The thicker internal layer 20 encourages heat to flow from the outside environment 35 to the PCM and from the PCM back to the outside environment 35.

Peak load delay also provides cost savings for buildings served by time-of-day utility rates. Moving the peak rate of heat transfer to later in the day increases the opportunity for natural cooling of the structure by outdoor conditions during the summer, and vice versa in the winter. By combining the PCM with insulation, the heat loss or gain is not only resisted, but the temperature change within the structure is moderated. This system 10 is also beneficial for structures protecting plants or animals, where perhaps a higher or lower temperature is desired over that for people, but where rapid fluctuations in inside temperature are still undesirable. It is obvious that the present invention is not limited to buildings, but would also apply in any situation in which a constant heat flow rate is desired, such as around pipes or in insulated clothing.

As a further aspect of the invention, it should be noted that the system 10 can be manufactured so that it can be installed in substantially the same way as current insulation. For example, fiberglass insulation is generally sold in "batts" that are compressed and rolled, while polystyrene insulation is generally provided as a board. The same packaging used for these conventional insulations can be used for this system 10. Batts containing the PCM between two layers of fiberglass insulation can be unrolled for placement in walls or ceilings of a structure, without the need for an additional step during installation. An offset pattern in the PCM layer 40, as illustrated in FIG. 1, may improve the ability to roll the system 10. Similarly, by placing the PCM within an extruded polystyrene sandwich, a board shape is maintained and the installation process remains the same for polystyrene alone or included within the present invention. Since the thermal filtering system 10 can be incorporated into a package having a weight and volume similar to that of conventional insulation systems, the thermal filtering system 10 may be readily used as a replacement for conventional insulation systems in new construction or in retrofitting applications.

Although the invention has been shown and described with respect to a preferred embodiment, it is obvious that equivalent alterations and modifications will occur to others skilled in the art as they read and understand this specification. The present invention includes all such equivalent alterations and modifications and is limited only by the scope of the following claims.

What is claimed is:

1. A thermal filtering system for minimizing the effects of external fluctuations in the temperature within an enclosure, comprising: an external insulation layer, an internal insulation layer, and a phase change layer disposed between the external insulation layer and the internal insulation layer, wherein the phase change layer includes a phase change material and expanded perlite, the phase change material being absorbed into the expanded perlite, with a ratio of phase change material to perlite of at least 6:1 by weight to saturation, wherein the amount of phase change material and the thermal resistance values of the insulation layers effect a thermal response for the filtering system having a delay of at least twenty-four hours, and wherein a sealant binds with the combination of the phase change material and the perlite to seal the combination from external moisture such that the thermal system may be cut without compromising the ability of the sealed combination to act as a thermal capacitor.

2. A thermal filtering system as set forth in claim 1 wherein the phase change material is selected from the group including sodium sulfate decahydrate, calcium chloride hydrates, and paraffin.

3. A thermal filtering system as set forth in claim 1 wherein the internal insulation layer has at least as much thermal resistance as the external insulation layer.

4. A thermal filtering system as set forth in claim 3 wherein the internal insulation layer has twice the thermal resistance of the external insulation layer.

5. A thermal filtering system as set forth in claim 1 wherein the phase change layer is at least two tenths of an inch thick.

6. A thermal filtering system as set forth in claim 1, wherein the sealant is selected from the group including paraffin and low melting point polyvinyl chloride (PVC).

7. A thermal filtering system as set forth in claim 1 wherein the insulation layers may be selected from the group of materials including extruded polystyrene, blown-in mineral or vegetable fibers, and fiberglass.

8. A thermal filtering system as set forth in claim 1 wherein the insulation layers include fiberglass.

9. A thermal filtering system as set forth in claim 1, wherein the insulation layers are fiberglass insulation having a batt shape which can be compressed, whereby the thermal system can be rolled.

10. A thermal filtering system as set forth in claim 1, wherein the insulation layers are extruded polystyrene having a board shape.

* * * * *